(12) United States Patent
Odman et al.

(10) Patent No.: US 7,120,126 B2
(45) Date of Patent: Oct. 10, 2006

(54) METHOD FOR IMPROVED MEDIA QUALITY FEEDBACK

(75) Inventors: Knut T. Odman, Vienna, VA (US); William M. Shvodian, McLean, VA (US)

(73) Assignee: Freescale Semiconductor, Inc., Austin, TX (US)

(*) Notice: Subject to any disclaimer, the term of this patent is extended or adjusted under 35 U.S.C. 154(b) by 526 days.

(21) Appl. No.: 10/348,012

(22) Filed: Jan. 22, 2003

(65) Prior Publication Data

US 2003/0137966 A1   Jul. 24, 2003

Related U.S. Application Data

(60) Provisional application No. 60/349,358, filed on Jan. 22, 2002.

(51) Int. Cl.
*H04B 7/212* (2006.01)
(52) U.S. Cl. .................. 370/252; 370/314; 370/347
(58) Field of Classification Search ................ 370/252, 370/338, 313, 314, 347, 442
See application file for complete search history.

(56) References Cited

U.S. PATENT DOCUMENTS

| | | | |
|---|---|---|---|
| 6,272,354 B1* | 8/2001 | Saario | 455/522 |
| 6,850,736 B1* | 2/2005 | McCune, Jr. | 455/67.13 |
| 2001/0012275 A1* | 8/2001 | Caldwell et al. | 370/252 |
| 2001/0053670 A1* | 12/2001 | Voyer | 455/69 |
| 2002/0168993 A1* | 11/2002 | Choi et al. | 455/522 |
| 2003/0022686 A1* | 1/2003 | Soomro et al. | 455/522 |

FOREIGN PATENT DOCUMENTS

EP   0 932 277 A   7/1999

OTHER PUBLICATIONS

Gandolfo, P.T.: "The Optimum MAC/PHY Combination for Multimedia Consumer Applications," White Paper, Online, Sep. 5, 2001, XP002245480, Retrieved from the Internet: <URL:http://www.xtremespectrum.com/PDF/MM_MACPHY.pdf>, retrieved on Jun. 25, 2003.

Office Communication from European Patent Office dated Sep. 8, 2005.

* cited by examiner

*Primary Examiner*—Min Jung (57) ABSTRACT

A method is provided for a local device in a network to determine media qualities for the transmission paths between it and all of the remote devices in a wireless network. Each of the devices in the network will be assigned at least one of a plurality of management time slots in a superframe rotation. Each device will always transmit a frame during this assigned time slot, whether it is a management frame or a null frame. Individual devices can listen during these frames, determine quality information about the transmission medium between the receiving device and the transmitting device, and based on this quality information set the transmission and reception parameters that the receiving device will use when later communicating with that particular transmitting device. The criteria for determining transmitting parameters and reception parameters can be different to make certain that compatible transmission and reception parameters are chosen among devices.

20 Claims, 5 Drawing Sheets

METHOD FOR IMPROVED MEDIA QUALITY FEEDBACK

CROSS-REFERENCE TO RELATED PATENT DOCUMENTS

This application relies for priority on U.S. provisional application Ser. No. 60/349,358, by Knut T. Odman and William M. Shvodian, filed Jan. 22, 2002, entitled "MEDIA QUALITY FEEDBACK," the contents of which is hereby incorporated by reference in its entirety.

BACKGROUND OF THE INVENTION

The present invention relates to wireless personal area networks and wireless local area networks. More particularly, the present invention relates to a method for improving the ability of devices in a network to determine the current quality of the transmission media.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

Figure 1:
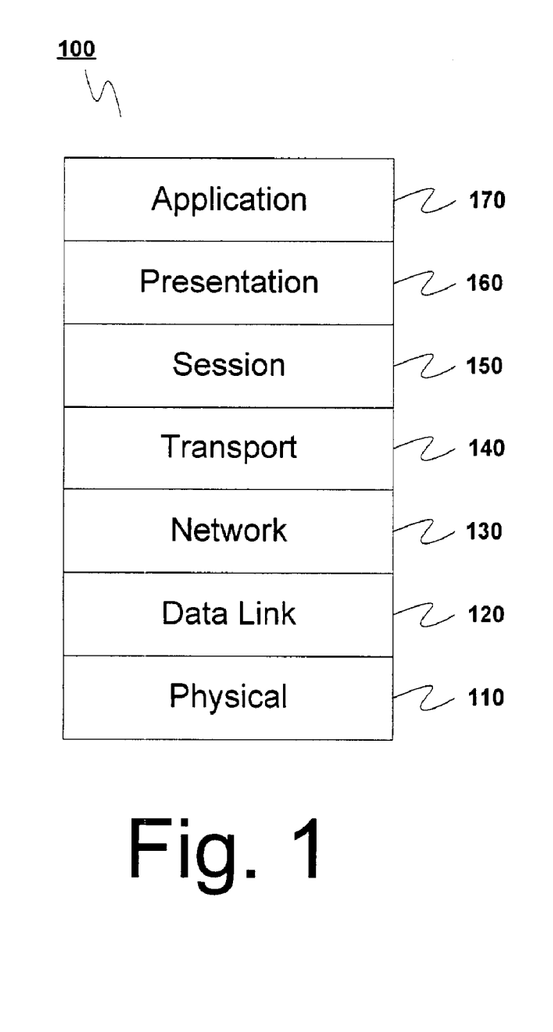
FIG. 1 is a diagram showing the hierarchy of the seven-layered OSI standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

Figure 2:
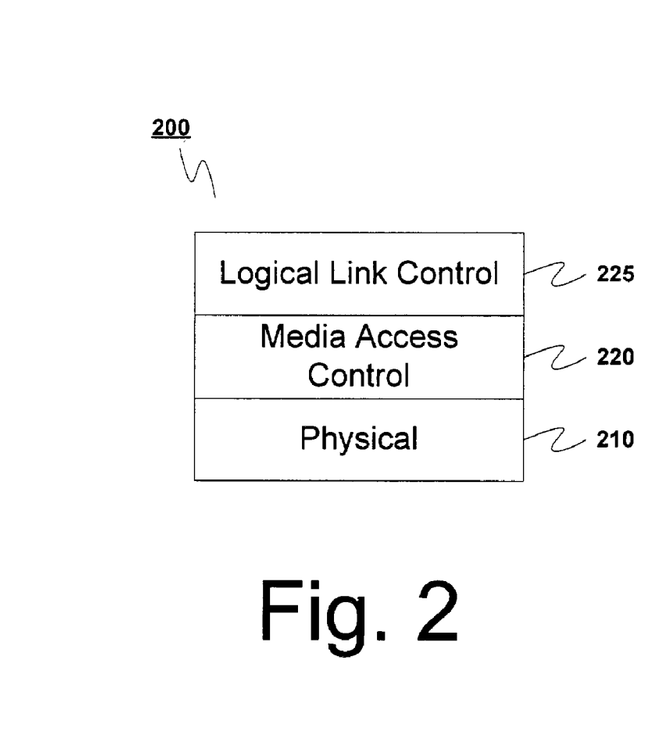
FIG. 2 is a diagram showing the IEEE 802 standard.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

Figure 3:
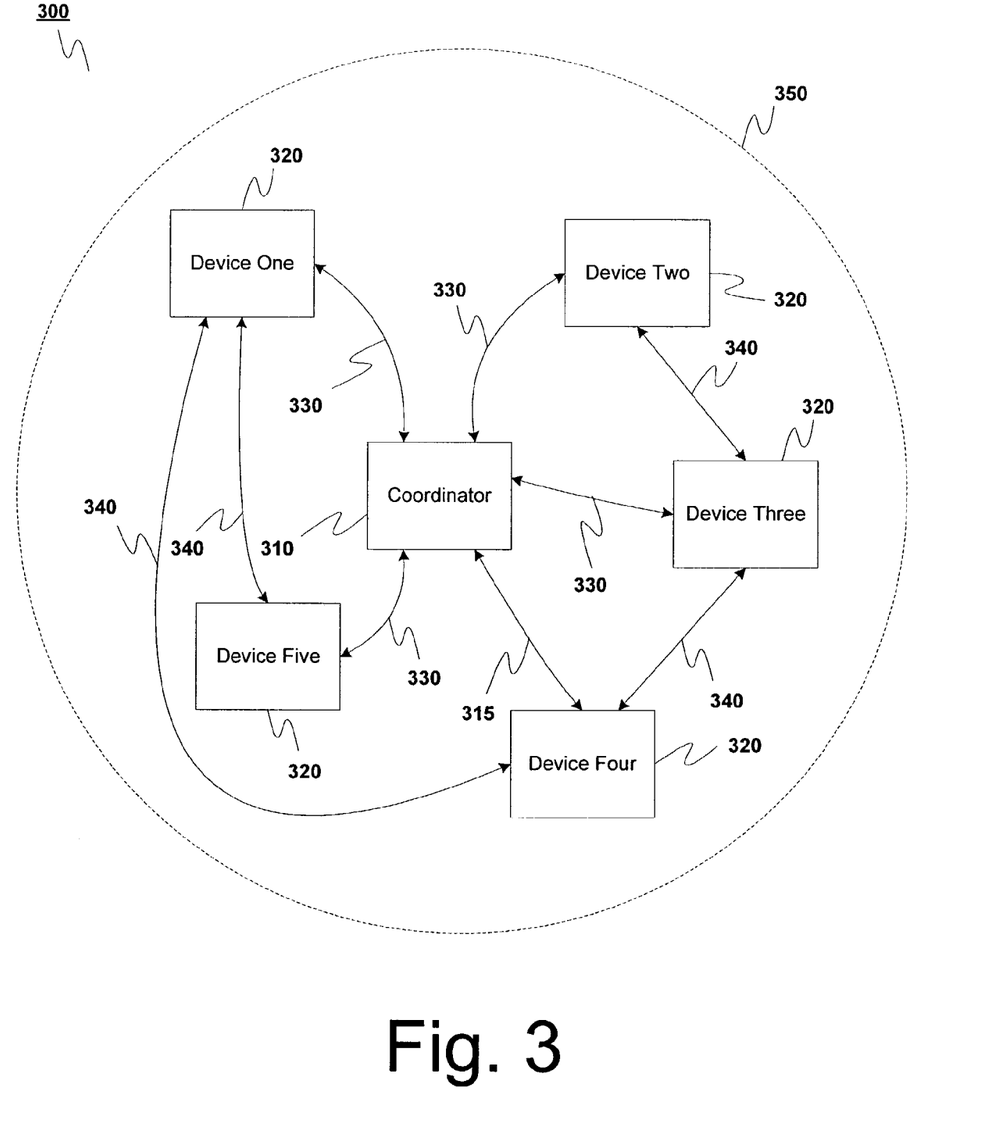
FIG. 3 is a block diagram of a wireless network according to a preferred embodiment of the present invention.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations or nodes) follow the time allocation instructions of the coordinator (i.e., they function as clients). Although the term "device" will be used throughout this disclosure for the sake of clarity, the terms "station," "node," and "client" can be freely used in its place.

The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course if the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

Figure 4:
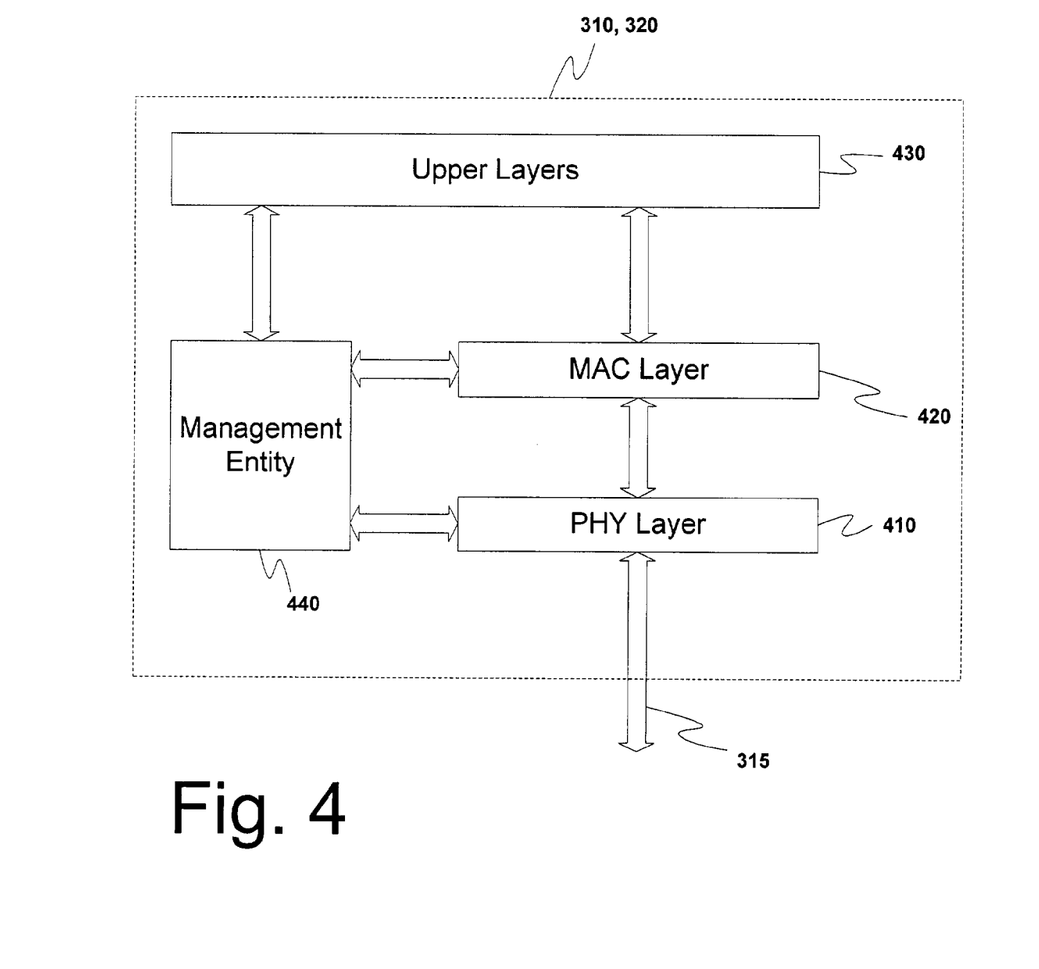
FIG. 4 is a block diagram of a device from the network of FIG. 3.

FIG. 4 is a block diagram of a device 310, 320 from the network 300 of FIG. 3. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420.

The MAC layer 420 serves as an interface between the data formats required by the PHY layer 410 and those required by the upper layers 430.

The upper layers 430 include the functionality of the device 310, 320. These upper layers 430 may include TCP/IP, TCP, UDP, RTP, IP, LLC, or the like.

The management entity 440 provides monitoring and control functions to the MAC layer 420 and the PHY layer 410, and facilitates communication between the upper layers and the MAC layer 420. The management entity 440 may include a device management entity (DME) for controlling the operation of the device and a MAC layer management entity (MLME) for managing operation of the MAC layer 420. In alternate embodiments the DME can be called a station management entity (SME).

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Device IDs and MAC Addresses

One important aspect of working with devices 310, 320 in a network 300 is uniquely identifying each of the devices 310, 320. There are several ways in which this can be accomplished.

Independent of any network it is in, each device 310, 320 has a unique MAC address that can be used to identify it. This MAC address is generally assigned to the device by the manufacturer such that no two devices 310, 320 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 320 in the network 300 to use in addition its unique MAC address. In the preferred embodiments the MAC 420 uses ad hoc device IDs to identify devices 310, 320. These device IDs can be used, for example, to route packets within the network 300 based on the ad hoc device ID of the destination of the packet. The device IDs are generally much smaller than the MAC addresses for each device 310, 320. In the preferred embodiments the device IDs are 4-bits and the MAC addresses are 48-bits.

Each device 310, 320 should maintain mapping table that maps the correspondence between device IDs and MAC addresses. The table is filled in based on the device ID and MAC address information provided to the non-coordinator devices 320 by the coordinator 310. This allows each device 310, 320 to reference themselves and the other devices in the network 300 by either device ID or MAC address.

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.ieee802.org/15/pub/TG3.html. Nothing in this disclosure should be considered to be incompatible with the draft 802.15.3 standard, as set forth on the IEEE 802 LAN/MAN Standards Committee web page.

Superframes

The available bandwidth in a given network 300 is split up in time by the coordinator 310 into a series of repeated superframes. These superframes define how the available transmission time is split up among various tasks. Individual frames of data are then transferred within these superframes in accordance with the timing set forth in the superframe.

Figure 5:
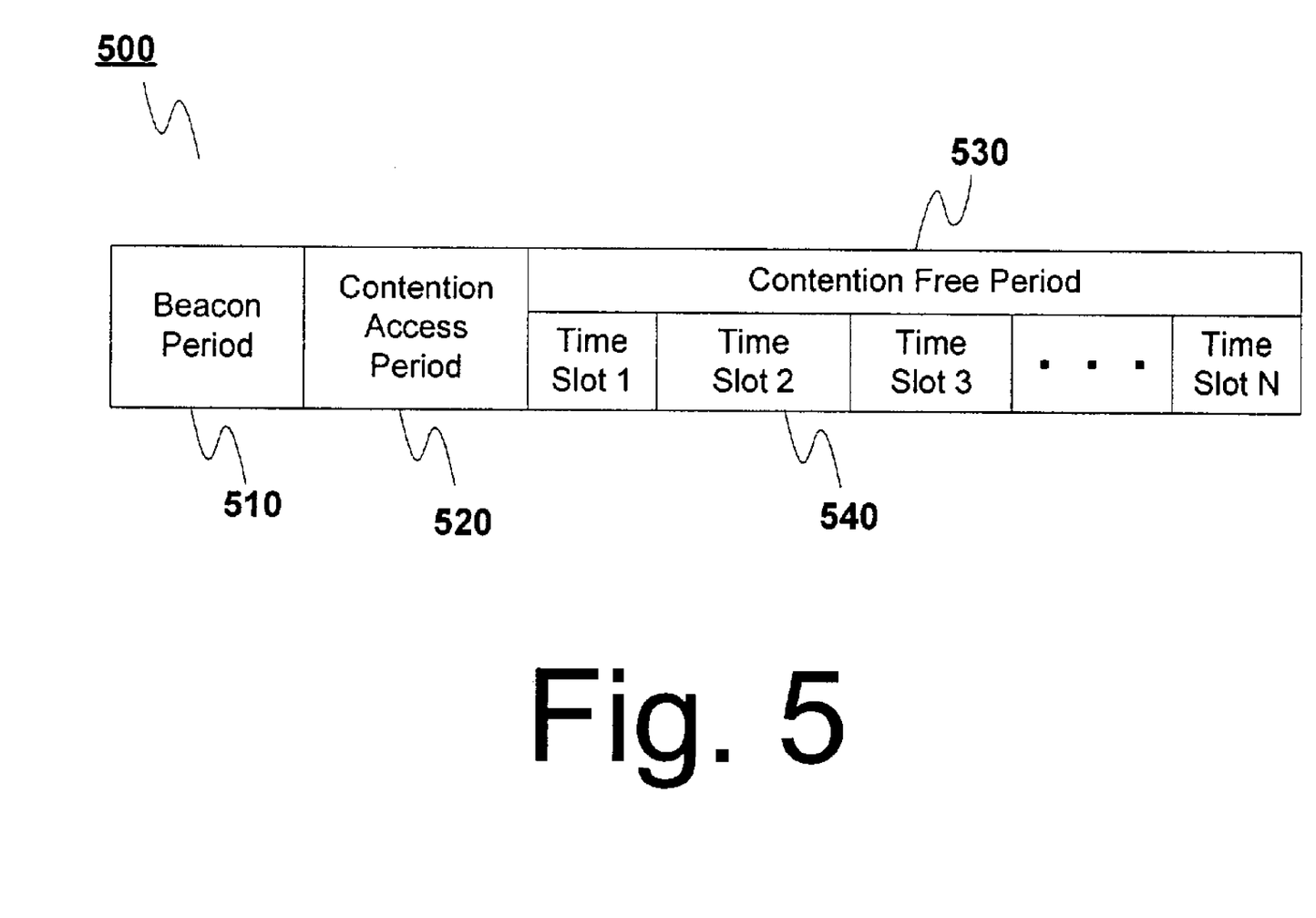
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame out to the non-coordinator devices 320 in the network 300. Such a beacon frame will include information for organizing the operation of devices within the superframe. Each non-coordinator device 320 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to a single transmitting device 310, 320 and one or more receiving devices 310, 320 for transmission of information between them. Generally each time slot 540 is assigned to a specific transmitter-receiver pair, though in some cases a single transmitter will transmit to multiple receivers at the same time. Exemplary types of time slots are: management time slots (MTS) and guaranteed time slots (GTS).

An MTS is a time slot that is used for transmitting administrative information between the coordinator 310 and one of the non-coordinator devices 320. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device.

A GTS is a time slot that is used for transmitting isochronous non-administrative data between devices 310, 320 in the network 300. This can include data transmitted between two non-coordinator devices 320, or non-administrative data transmitted between the coordinator 310 and a non-coordinator device 320.

As used in this application, a stream is a communication between a source device and one or more destination devices. The source and destination devices can be any devices 310, 320 in the network 300. For streams to multiple destinations, the destination devices can be all or some of the devices 310, 320 in the network 300.

In some embodiments the uplink MTS may be positioned at the front of the CFP 530 and the downlink MTS positioned at the end of the CFP 530 to give the coordinator 310 a chance to respond to an uplink MTS in the in the downlink MTS of the same superframe 500. However, it is not required that the coordinator 310 respond to a request in the same superframe 500. The coordinator 310 may instead respond in another downlink MTS assigned to that non-coordinator device 320 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 320 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310.

For simplicity, a single guard time value may be used for the entire superframe. The guard time will preferably be placed at the end of each beacon frame, GTS, ATS, and MTS.

Figure 6:
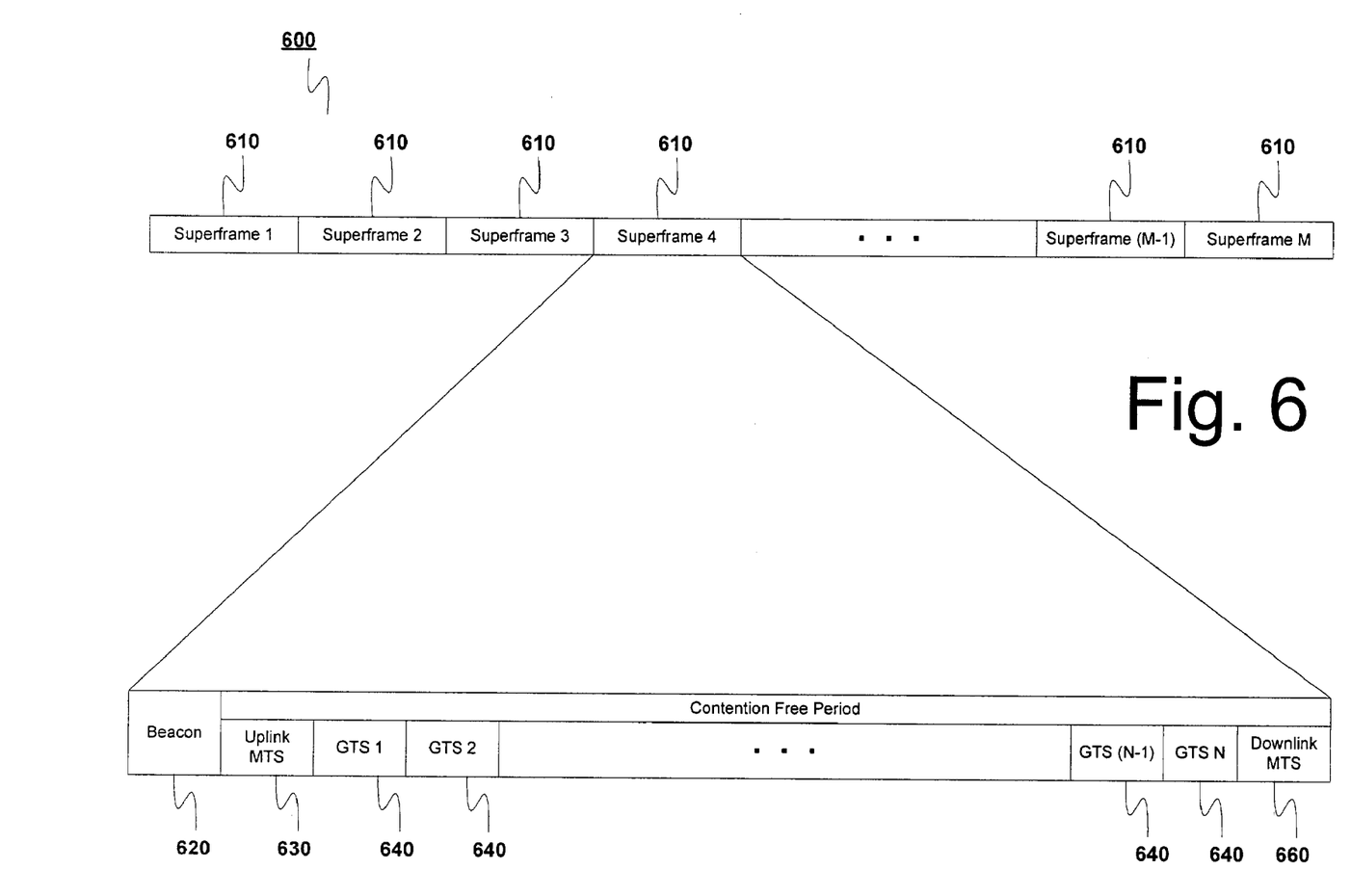
FIG. 6 is a block diagram of a specific superframe design according to a preferred embodiment of the present invention.

The exact design of a superframe 500 can vary according to implementation. FIG. 6 shows an example of a specific superframe design. As shown in FIG. 6, the transmission scheme 600 involves dividing the available transmission time into a plurality of superframes 610. Each individual superframe 610 includes a beacon frame 620, an uplink MTS 630, a plurality of GTS 640, and a downlink MTS 660. This exemplary superframe includes no contention access period.

The beacon frame 620 indicates by association ID (known as a device ID in the IEEE 802.15.3 draft standard) a non-coordinator device 320 that is assigned to the current superframe 610. It also indicates via a receive-transmit table the transmitter/receiver assignments for the individual GTS 640.

In the exemplary superframe structure shown in FIG. 6, the uplink MTS 630 is set aside for the non-coordinator device 320 assigned to the current superframe 610 to upload signals to the coordinator 310. All other non-coordinator devices 320 remain silent on the current channel during this time slot. In alternate embodiments that use multiple channels, all other non-coordinator devices 320 on that channel must remain silent during an uplink MTS 630, though they may still transmit on alternate channels.

The plurality of GTS 640 are the time slots set aside for each of the devices 310, 320 to allow communication between devices. They do so in accordance with the information set forth in the receive-transmit table in the beacon 620. Each GTS 640 is preferably large enough to transmit one or more data frames. When a transmitter-receiver set is assigned multiple GTS 640, they are preferably contiguous.

The downlink MTS 660 is set aside for the coordinator 310 to download signals to the non-coordinator device 320 assigned to the current superframe 610. All other non-coordinator devices 320 may ignore all transmissions during this time slot.

The lengths of the uplink and downlink MTS 630 and 660 must be chosen to handle the largest possible management frame, an immediate acknowledgement (ACK) frame, and the receiver-transmitter turnaround time. For the GTS 640, the length and number must be chosen to accommodate the specific requirements of frames to be transmitted, e.g., short MPEG frames, large frames of the maximum allowable length, and streaming vs. immediate ACK operation.

Although the disclosed embodiment uses a plurality of GTS 640, one uplink MTS 630 placed before the GTS 640, and one downlink MTS 660 placed after the GTS 640, the number, distribution, and placement of GTS 640 and MTS 630, 660 may be varied in alternate embodiments. Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

However, conventional network designs can operate at higher power levels or lower transmission rates than they might otherwise because the non-coordinator devices 320 have no way of telling whether they are transmitting at too high a power level. The present invention provides a system and method for achieving such feedback.

SUMMARY OF THE INVENTION

Consistent with the title of this section, only a brief description of selected features of the present invention is now presented. A more complete description of the present invention is the subject of this entire document.

An object of the present invention is to provide a method by which each device in a network can continually monitor the quality of the media between it and each of the other devices in the network.

Another object of the present invention is to provide a method of media quality that will reduce the possibility of a transmitting device using a transmission format that is at odds with the reception format used by a receiving device.

Another feature of the present invention is to ensure that a signal is being transmitted by each device during a management time slot assigned to it so that all other devices in the network will be guaranteed to be able to hear a signal from that device with a known frequency.

These and other objects are accomplished by way of a method for a local device to determine media qualities of a plurality of transmission paths between the local device and a plurality of remote devices in a wireless network, each of the local device and the remote devices being assigned at least one of a plurality of management time slots in a superframe rotation, comprising: transmitting a local frame from the local device to a network coordinator during each of the management time slots assigned to the local device, the local frame being transmitted according to a set of transmission criteria; receiving a remote frame during each of the management time slots assigned to one of the remote devices, the remote frame being received according to a set of reception criteria; determining quality information about a transmission medium between the local device and the remote device that transmitted the remote frame; determining a modified set of transmission criteria in the local device for transmissions to the remote device based on the quality information; determining a modified set of reception criteria in the local device for transmissions from the remote device based on the quality information; and storing in the local device the modified set of transmission criteria and the modified set of reception criteria as new transmission criteria and new reception criteria, respectively. The local frame is preferably a management frame if the local device has management data to send to a network coordinator, or a null frame if the local device has no management data to send the coordinator.

The quality information may be signal-to-noise ratio values. The local device preferably stores the signal-to-noise ratio values.

The method may further comprise sending data from the local device to one of the remote devices during a time slot assigned to the local unit using the new transmission criteria.

The transmission criteria preferably comprises at least one of: preamble size, transmission power, transmission rate, amount of forward error correction used, acknowledgement policy, and fragment size. The reception criteria preferably comprises at least one of: preamble size, transmission power, transmission rate, amount of forward error correction used, acknowledgement policy, and fragment size.

The modified set of transmission criteria is preferably determined using a different set of criteria than the modified set of reception criteria is determined using.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which.

DETAILED DESCRIPTION OF THE PREFERRED EMBODIMENTS

Preferred embodiments of the present invention will now be described with reference to the drawings. Throughout the several views, like reference numerals designate identical or corresponding parts.

In normal operation devices can often tell that they are transmitting at too high a transmission rate by the simple fact that the device 310, 320 that they are trying to reach cannot hear their transmission. However, there has been provided no useful way for them to determine whether they are operating at too low a transmission rate, since the destination device 310, 320 for a given packet of data successfully receives the packet whether it is at a good transmission rate or a transmission rate that is too low. Previously no feedback existed that enabled a transmitting device 310, 320 to select the most appropriate settings for the transmission.

The preferred embodiments described below allow a device 310, 320 to select appropriate transmission rate and acknowledgement policies based on the current status of the transmission media, without any additions to the operation protocol.

The preferred embodiments employ a null frame, used as a "ping" signal, that is sent from the non-coordinator devices 320 to the coordinator 310 during any MTS assigned to a given non-coordinator device 320 in which no other traffic exists. By using these null frames, the system ensures that each non-coordinator device 320 will transmit something in the MTS assigned to it. In this way, the other non-coordinator devices 320 can obtain media information, i.e., information about the quality of the transmission media, about all of the other non-coordinator devices 320 without having to use explicit feedback signals or feedback information fields in any other signals.

By forcing the coordinator 310 to acknowledge these null frames, the non-coordinator devices 320 can obtain media information, i.e., information about the quality of the transmission media, from the coordinator 310 without having to use explicit feedback signals or feedback information fields in any other signals.

The disclosed system and method can be used with any wireless network, e.g. a network based on the IEEE 802.15.3 standard, or any other protocol in which the quality of the media needs to be known. However, the null frame transmissions make it particularly suitable for ultrawide bandwidth (UWB) signals, since there is no significant overhead for the non-coordinator devices 320 to transmit.

The length of each superframe (i.e., the interval between the beacons) needs to be short enough to keep the information updated. Preferably this would be below 50 ms for an eight station network. However, any appropriate superframe length (beacon interval) can be chosen that will keep the media information sufficiently up-to-date. This can change according to the particular embodiment.

In alternate embodiments networks could use reception quality information fields in the acknowledgement (ACK) frame to pass media information. For example, each ACK frame could include not only an indication that a frame was received, but also an indication of the received power, signal strength, etc. of the received frame. However, this will require that: (1) devices 310, 320 always receive the ACK frame; (2) devices may have to send an extra signal to get the ACK frame; and (3) a given device may waste its first frame if it's sent using inappropriate parameters, since the ACK frame is required to get the latest status.

Introduction

The preferred embodiments of the present invention relate to a TDMA method of accessing a wireless medium using a network topology consisting of several devices 320 including a coordinator 310. (See FIG. 3)

The preferred embodiment disclosed below meets three important requirements. It can support at least three device 310, 320 at an isochronous rate of 25 Mbps per device 310, 320. It can support devices associating with and disassociating from the network 300. And it support two transmission rates: one transmission rate for the preamble, and one transmission rate for data.

Preambles

A preamble is used at the beginning of each frame transmitted between two devices 310, 320 for receiver acquisition. The preamble allows the receiving device to lock onto and synchronize with the transmitting device, and to train itself so that it knows how to extract the modulated payload out of the frame. Depending upon the media quality and the transmission parameters, this preamble could be varied in length. For example, if the media conditions were such that signal quality was poor, a longer preamble might be needed to allow more time to prepare the receiver to process the incoming frame. If, however, the media conditions were good such that signal quality was poor, the frame could afford a shorter preamble.

A feature of the present invention is that the length of the preambles in PMD may be changed as needed.

In one preferred embodiment, the network 310 will start with a default short preamble and change to a long preamble during bad media quality transmissions. In alternate embodiments, however, the network 300 could start with a long preamble and switch to a short preamble during good media quality transmissions to make sure initial packets are safely transmitted. In other embodiments some portions of the superframe 500, 710, e.g., the beacon and MTS, could always use long preambles to ensure their successful transmission in all circumstances.

For the purposes of the examples below, it is assumed that the media quality is the same in both directions between two devices 310, 320. Therefore a received signal can indicate the reception quality in the other end. It is also assumed that the PHY layer 410 in a given device 310, 320 can deliver a signal-to-noise ratio (SNR) indicator to the corresponding MAC layer 410.

Network Operation

As noted above, periodically the superframes may contain one or more MTS. In particular, it is preferable that in each superframe one non-coordinator device 320 in the network be assigned at least one MTS. The available MTS in consecutive superframes are preferably distributed among the non-coordinator devices 320 using a fair algorithm such that each non-coordinator device 320 is periodically assigned at least one MTS. (See FIG. 7 and related disclosure.)

According to preferred embodiments of the present invention, all non-coordinator devices 320 stay awake and listen to all traffic during every MTS. While they may enter a low power sleep mode during other portions of the superframe 500, 710, they will always listen during each MTS, regardless of whom it assigned to. Because the MTS are short in comparison to the remainder of the superframe, this will not cause a great increase in power consumption.

During each uplink MTS assigned to it, a given non-coordinator device 320 will send any necessary network maintenance frames to the coordinator 310. Similarly, during each downlink MTS assigned to it, a given non-coordinator device 320 will receive any necessary network maintenance frames from the coordinator 310. However, unlike in conventional networks, when a non-coordinator device 320 has nothing to send/receive during one of its assigned MTS, instead of remaining silent it will send a null frame directed to the coordinator 310. According to this preferred embodiment the coordinator 310 must always acknowledge these null frames (i.e., by sending the non-coordinator device 320 an ACK frame), regardless of the general acknowledgement policy in the network.

Then, during each MTS, all of the other non-coordinator devices 320 listen for both the frame transmitted by the device 320 assigned to the MTS, and any ACK frame from the coordinator 310. Each non-coordinator device 320 will always be transmitting something, whether it be a management frame or a null frame; and the coordinator 310 will more often than not be responding with an ACK frame.

Based on an analysis of one or more incoming signals from each device over the course of one or more MTS, the each other device can determine certain signal quality parameters, e.g., signal-to-noise ratios (SNR). These values are preferably stored in a table in each device that indicates the relative SNR of each other device in the network 300.

Preferably, the PHY layer 410 in each non-coordinator device 320 determines the SNR for the non-coordinator device 320 assigned to the current MTS based on the quality of the received null/management frame, and determines the SNR for the coordinator 310 based on the SNR of the ACK frame sent by the coordinator 310 to the non-coordinator device 320 assigned to the current MTS.

Thus, through this process, every non-coordinator device 320 will periodically be able to calculate a SNR reading for every other device 310, 320 in the network. Each non-coordinator device 320 must be assigned an MTS with some reasonable frequency, and will always transmit something in that MTS, even if it's just a null frame. Furthermore, the coordinator 310 replies to most MTS frames and all null frames, so it will transmit even more frequently.

Once it calculates the SNR for a device 310, 320, a non-coordinator device 320 compares the SNR value a set threshold value set in a network information base. Then, based on this comparison the transmissions to that device will be assigned certain transmission parameters. These parameters could include fragment size, PHY rate, preamble length, use of FEC, ACK policy, transmit power, and the like. As an example for this disclosure, the device will choose between a long or a short preamble based on the SNR comparison. In alternate embodiments other parameters could also be changed. In addition, multiple thresholds could be provided to allow more than two choices of parameters.

The MAC layer 420 of each non-coordinator device 320 preferably maintains a table including the current preferred preamble length for each other device 310, 320 in the network 300, determined based on the comparison above. As noted above, in alternate embodiments this table entry could comprise additional parameters, such as the preferred transmission ACK-policy, the preferred transmission rate, etc. that should be used when transmitting to a particular device. The devices 310, 320 fill in these fields based on the SNR comparisons made during MTS assigned to other devices 310, 320 in the network 300 and any corresponding ACK from the coordinator 310.

Preferably each non-coordinator device 320 uses the SNR value before it is processed by a decision feedback equalizer (DFE), if any. The only reason to change the preamble rate and leave the PHY payload rate the same is because the DFE is improving the signal sufficiently to compensate for a multipath channel).

Then, when a given non-coordinator device 320 sends a frame to any given device 310, 320, it can read the current preamble mode (or whatever other parameters are determined) for transmissions made to that device 310, 320 from the table and indicate that preamble length (or other parameters) to the PHY layer 410. The PHY layer 410 can then prepare the frames accordingly.

Likewise, when receiving a frame from any given device 310, 320, the current preamble mode (or other parameters) for messages received from that device 310, 320 can be read from the table and indicated to the PHY layer 410. The PHY layer 410 can then process the incoming frames accordingly.

Although a single preamble table can be maintained, it is preferable to keep separate transmitter and receiver preamble tables, filled using slightly different SNR thresholds. In particular, a transmit SNR threshold for using a long preamble should be lower than a receive SNR threshold for using a long preamble. Thus, when operating as a transmitter, a non-coordinator device 320 will be more likely to use a long preamble than when it was operating as a receiver.

This address the problem of what happens when the SNR is close to the threshold. Without two separate thresholds, one device 310, 320 might choose to send a long preamble while the other device 310, 320 chose to receive a short preamble. This would cause the data to be incorrectly received. However, by adjusting the transmit and receive thresholds accordingly, the protocol can make certain that if an error is made, it will be for the transmitter to send a long preamble when it only needed to send a short preamble. This is because a device 310, 320 expecting a short preamble can receive a long preamble, while a device 310, 320 expecting a long preamble will not be able to receive a frame with a short preamble.

As shown above, the network 300 can support both a best-case and a worst-case length of preamble. When transmission conditions are poor, a worst-case (long) preamble length can be used. And when transmission conditions are good, a best-case (short) preamble length can be used. And since the preambles are determined on a device-by-device basis, different preamble lengths can be used within the network 300 as needed based on conditions between various devices 310, 320.

In some embodiments a transmitting device 310, 320 could also fall back to more conservative parameters (e.g., a long preamble) if a transmission using less conservative parameters (e.g., a short preamble) does not pass successfully. In other words, if a device 310, 320 sends a frame using parameters from its database and the transmission is unsuccessful, e.g., it doesn't receive a response or an ACK frame, then the transmitting device 320 could transmit using more conservative parameters, despite what the relevant entry in the database says.

Likewise, a receiving device 310, 320 could also fall back to more conservative parameters (e.g., a long preamble) if a transmission using less conservative parameters (e.g., a short preamble) does not pass successfully. In other words, if a receiving device 310, 320 cannot successfully receive a frame using parameters from its database, then the receiving device 320 could change to use more conservative parameters, despite what the relevant entry in the database says.

The worst case scenario for using the wrong preamble mode is the maximum time between two transmissions from a device 310, 320 which would be super frame length*MTS cycle length, or in current implementation 4*16 ms. In other words, if a device is wrong about the parameters to use, it suffers a loss in time equal to the time it can transmit again using parameters more likely to succeed.

Although this disclosed embodiment uses only two preamble lengths, alternate embodiments could use multiple preamble lengths using the same mechanism. Such embodiments would have to provide multiple thresholds for determining which preambles to assigned to each device.

Obviously, numerous modifications and variations of the present invention are possible in light of the above teachings. It is therefore to be understood that within the scope of the appended claims, the invention may be practiced otherwise than as specifically described herein.

We claim:

1. A method for a local device to determine media qualities of a plurality of transmission paths between the local device and a plurality of remote devices in a wireless network, each of the local device and the remote devices being assigned at least one of a plurality of management time slots in a superframe rotation, comprising:

transmitting a local frame from the local device to a network coordinator during each of the management time slots assigned to the local device, the local frame being transmitted according to a set of transmission criteria;

receiving a remote frame during each of the management time slots assigned to one of the remote devices, the remote frame being received according to a set of reception criteria;

determining quality information about a transmission medium between the local device and the remote device that transmitted the remote frame;

determining a modified set of transmission criteria in the local device for transmissions to the remote device based on the quality information;

determining a modified set of reception criteria in the local device for transmissions from the remote device based on the quality information; and storing in the local device the modified set of transmission criteria and the modified set of reception criteria as new transmission criteria and new reception criteria, respectively, wherein the local frame is a management frame if the local device has management data to send to a network coordinator, or a null frame if the local device has no management data to send the coordinator.

2. A method for a local device to determine media qualities of a plurality of transmission paths between the local device and a plurality of remote devices in a wireless network, as recited in claim 1, wherein the quality information is signal-to-noise ratio values.

3. A method for a local device to determine media qualities of a plurality of transmission paths between the local device and a plurality of remote devices in a wireless network, as recited in claim 2, wherein the local device stores the signal-to-noise ratio values.

4. A method for a local device to determine media qualities of a plurality of transmission paths between the local device and a plurality of remote devices in a wireless network, as recited in claim 1, further comprising sending data from the local device to one of the remote devices during a time slot assigned to the local unit using the new transmission criteria.

5. A method for a local device to determine media qualities of a plurality of transmission paths between the local device and a plurality of remote devices in a wireless network, as recited in claim 1, wherein the transmission criteria comprises at least one of: preamble size, transmission power, transmission rate, amount of forward error correction used, acknowledgement policy, and fragment size.

6. A method for a local device to determine media qualities of a plurality of transmission paths between the local device and a plurality of remote devices in a wireless network, as recited in claim 1, wherein the reception criteria comprises at least one of: preamble size, transmission power, transmission rate, amount of forward error correction used, acknowledgement policy, and fragment size.

7. A method for a local device to determine media qualities of a plurality of transmission paths between the local device and a plurality of remote devices in a wireless network, as recited in claim 1, wherein the modified set of transmission criteria is determined using a different set of criteria than the modified set of reception criteria is determined using.

8. A method for a local non-coordinator device to determine a media quality of a transmission path between the local non-coordinator device and a remote non-coordinator device in a wireless network, comprising:
   receiving a first remote frame during a first management time slot assigned to the remote non-coordinator device, the first remote frame being received according to initial reception criteria;
   determining quality information about a transmission medium between the local non-coordinator device and the remote non-coordinator device based on the reception of the first remote frame;
   determining modified reception criteria in the local non-coordinator device for transmissions from the remote non-coordinator device based on the quality information; and
   storing the modified reception criteria as new reception criteria,
   wherein the first remote frame is a management frame if the remote non-coordinator device has management data to send to a network coordinator, or a null frame if the remote non-coordinator device has no management data to send to the network coordinator.

9. A method for a local non-coordinator device to determine a media quality of a transmission path between the local non-coordinator device and a remote non-coordinator device in a wireless network, as recited in claim 8, further comprising: receiving a second remote frame during a second management time slot assigned to the remote non-coordinator device, the second remote frame being received according to the new reception criteria.

10. A method for a local non-coordinator device to determine a media quality of a transmission path between the local non-coordinator device and a remote non-coordinator device in a wireless network, as recited in claim 8, further comprising:
   storing initial transmission criteria in the local non-coordinator device;
   determining modified transmission criteria in the local non-coordinator device for transmissions to the remote non-coordinator device based on the quality information, after storing the initial transmission criteria; and
   storing the modified transmission criteria as new transmission criteria.

11. A method for a local non-coordinator device to determine a media quality of a transmission path between the local non-coordinator device and a remote non-coordinator device in a wireless network, as recited in claim 8, further comprising: transmitting a local frame during a second management time slot assigned to the local device, the local frame being transmitted according to initial transmission criteria.

12. A method for a local non-coordinator device to determine a media quality of a transmission path between the local non-coordinator device and a remote non-coordinator device in a wireless network, as recited in claim 10, wherein the initial transmission criteria and the new transmission criteria each comprise at least one of: preamble size, transmission power, transmission rate, amount of forward error correction used, acknowledgement policy, and fragment size.

13. A method for a local non-coordinator device to determine a media quality of a transmission path between the local non-coordinator device and a remote non-coordinator device in a wireless network, as recited in claim 8, wherein the initial reception criteria and the new reception criteria each comprise at least one of: preamble size, transmission power, transmission rate, amount of forward error correction used, acknowledgement policy, and fragment size.

14. A method for a local non-coordinator device to determine a media quality of a transmission path between the local non-coordinator device and a remote non-coordinator device in a wireless network, as recited in claim 8, wherein the quality information is a signal-to-noise ratio.

15. A method for a local non-coordinator device to determine a media quality of a transmission path between the local non-coordinator device and a remote non-coordinator device in a wireless network, comprising:
   storing initial transmission criteria in the local non-coordinator device;
   receiving a remote frame during a management time slot assigned to the remote non-coordinator device, after storing the initial transmission criteria, the remote frame being received according to initial reception criteria;
   determining quality information about a transmission medium between the local non-coordinator device and the remote non-coordinator device based on the reception of the remote frame;
   determining a modified transmission criteria in the local non-coordinator device for transmissions to the remote non-coordinator device based on the quality information; and
   storing the modified transmission criteria as new transmission criteria,
   wherein the remote frame is a management frame if the remote non-coordinator device has management data to send to a network coordinator, or a null frame if the remote non-coordinator device has no management data to send to the network coordinator.

16. A method for a local non-coordinator device to determine a media quality of a transmission path between the local non-coordinator device and a remote non-coordinator device in a wireless network, as recited in claim 15, further comprising: receiving a second remote frame during a second management time slot assigned to the remote non-coordinator device, the second remote frame being received according to the new reception criteria.

17. A method for a local non-coordinator device to determine a media quality of a transmission path between the local non-coordinator device and a remote non-coordinator device in a wireless network, as recited in claim 15, further comprising: transmitting a local frame during a second management time slot assigned to the local device, the local frame being transmitted according to initial transmission criteria.

18. A method for a local non-coordinator device to determine a media quality of a transmission path between the local non-coordinator device and a remote non-coordinator device in a wireless network, as recited in claim 15, wherein the quality information is a signal-to-noise ratio.

19. A method for a local non-coordinator device to determine a media quality of a transmission path between the local non-coordinator device and a remote non-coordinator device in a wireless network, as recited in claim 15, wherein the initial transmission criteria and the new transmission criteria each comprise at least one of: preamble size, transmission power, transmission rate, amount of forward error correction used, acknowledgement policy, and fragment size.

20. A method for a local non-coordinator device to determine a media quality of a transmission path between the local non-coordinator device and a remote non-coordinator device in a wireless network, as recited in claim 15, wherein the initial reception criteria and the new reception criteria each comprise at least one of: preamble size, transmission power, transmission rate, amount of forward error correction used, acknowledgement policy, and fragment size.

* * * * *